United States Patent [19]

Mesnel et al.

[11] Patent Number: 5,296,067
[45] Date of Patent: Mar. 22, 1994

[54] PROCESS FOR PRODUCTION OF A SEAL FOR THE FRAME OF AN APERTURE OF THE BODY OF AN AUTOMOBILE

[75] Inventors: Francois Mesnel, Neuilly-sur-Seine; Gerard Mesnel, Carrieres-sur-Seine, both of France

[73] Assignee: Etablissements Mesnel S.A., France

[21] Appl. No.: 805,103

[22] Filed: Dec. 10, 1991

[51] Int. Cl.⁵ .................. B32B 31/00; E06B 7/16
[52] U.S. Cl. .................... 156/221; 156/289; 156/294; 49/479; 49/490
[58] Field of Search .......... 156/289, 152, 307.1, 156/307.7, 221, 196, 292, 294; 49/479, 490, 491

[56] References Cited

U.S. PATENT DOCUMENTS

| | | | |
|---|---|---|---|
| 2,794,221 | 6/1957 | Bedics | 49/479 |
| 2,899,238 | 8/1959 | Swanson | 49/479 X |
| 3,033,733 | 5/1962 | Poltorak | 156/289 X |
| 3,837,957 | 9/1974 | Mesnel | |
| 4,067,146 | 1/1978 | Mesnel et al. | 49/490 |
| 4,078,959 | 3/1978 | Palfey et al. | 156/289 X |
| 4,374,880 | 2/1983 | Mesnel | |
| 4,708,898 | 11/1987 | Gommier et al. | 49/491 X |
| 5,099,612 | 3/1992 | Hayashi et al. | 49/479 |

FOREIGN PATENT DOCUMENTS

| | | |
|---|---|---|
| 2133107 | 11/1972 | France . |
| 2247341 | 5/1975 | France . |
| 2469321 | 5/1981 | France . |
| 2624191 | 6/1989 | France . |
| 472567 | 7/1968 | Switzerland . |
| 1478714 | 7/1977 | United Kingdom . |
| 1544420 | 4/1979 | United Kingdom . |
| 2213186 | 12/1988 | United Kingdom . |

*Primary Examiner*—David A. Simmons
*Assistant Examiner*—Chester T. Barry
*Attorney, Agent, or Firm*—Scully, Scott Murphy & Presser

[57] ABSTRACT

A seal for the frame of an aperture of the body of an automobile, wherein the seal includes a reinforced grip-forming channel section of a U-shaped cross-section in a thermoplastic material, and a tubular sealing element in a resiliently deformable material, which adheres laterally to the outer surface of the channel section of the U-shaped cross-section. Along at least part of the length of the seal corresponding to the location of corners in the aperture frame to be equipped, the tubular element has a length greater than that of the corresponding part of the channel section. The portion of the tubular element of length greater than that of the corresponding part of the channel section being offset laterally with respect to the latter.

6 Claims, 3 Drawing Sheets

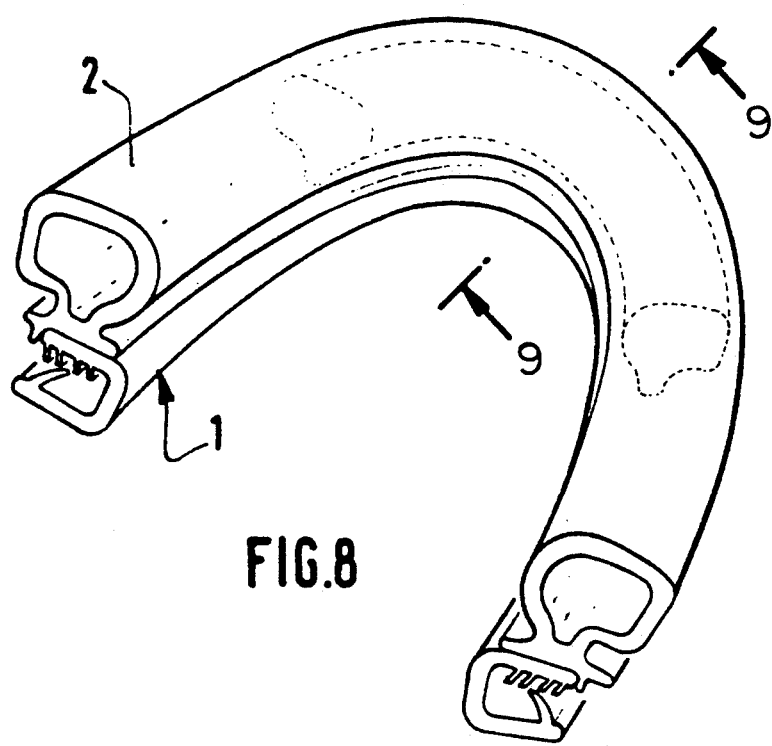
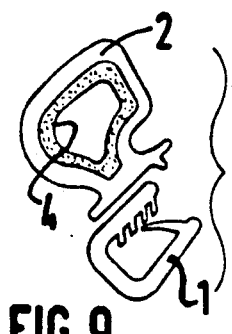
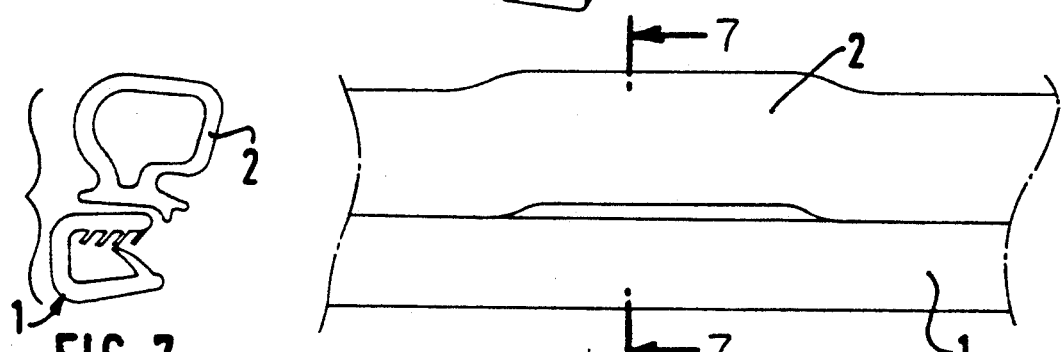
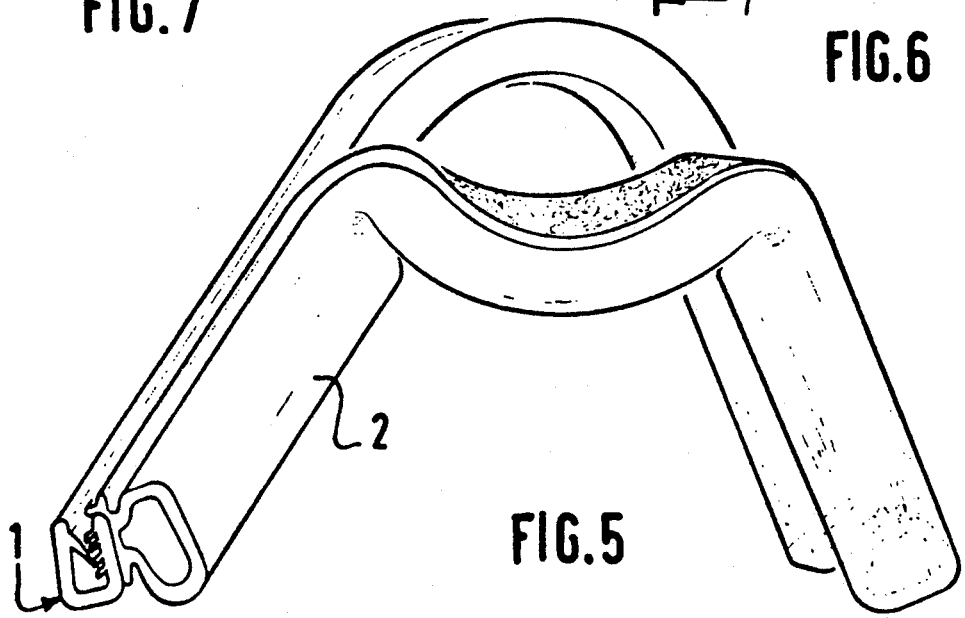

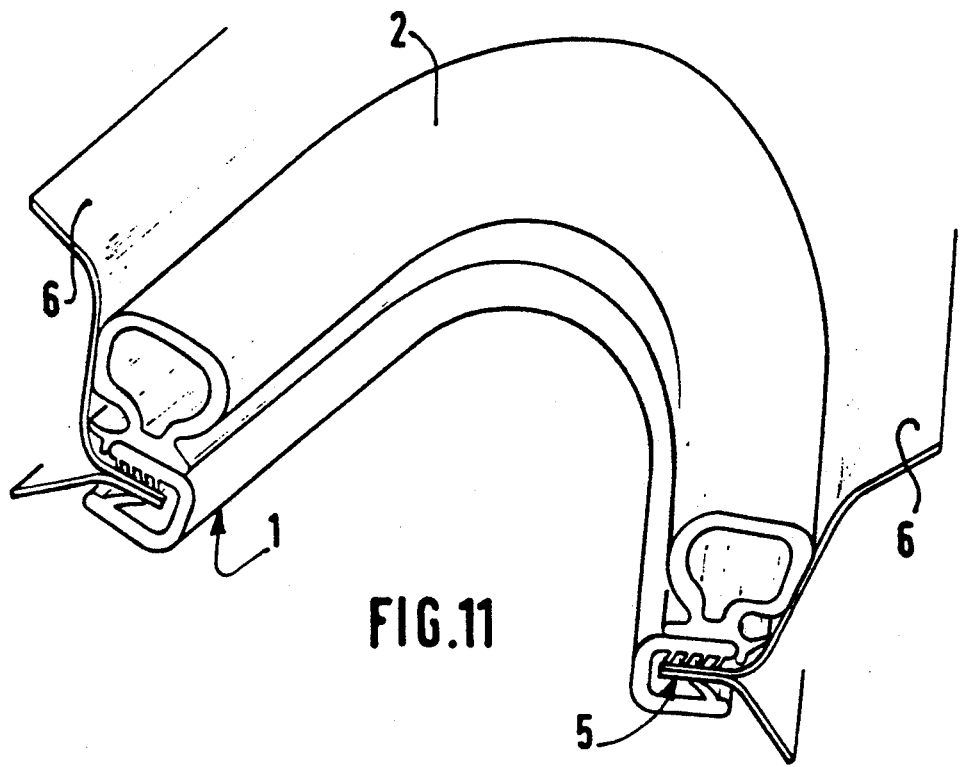
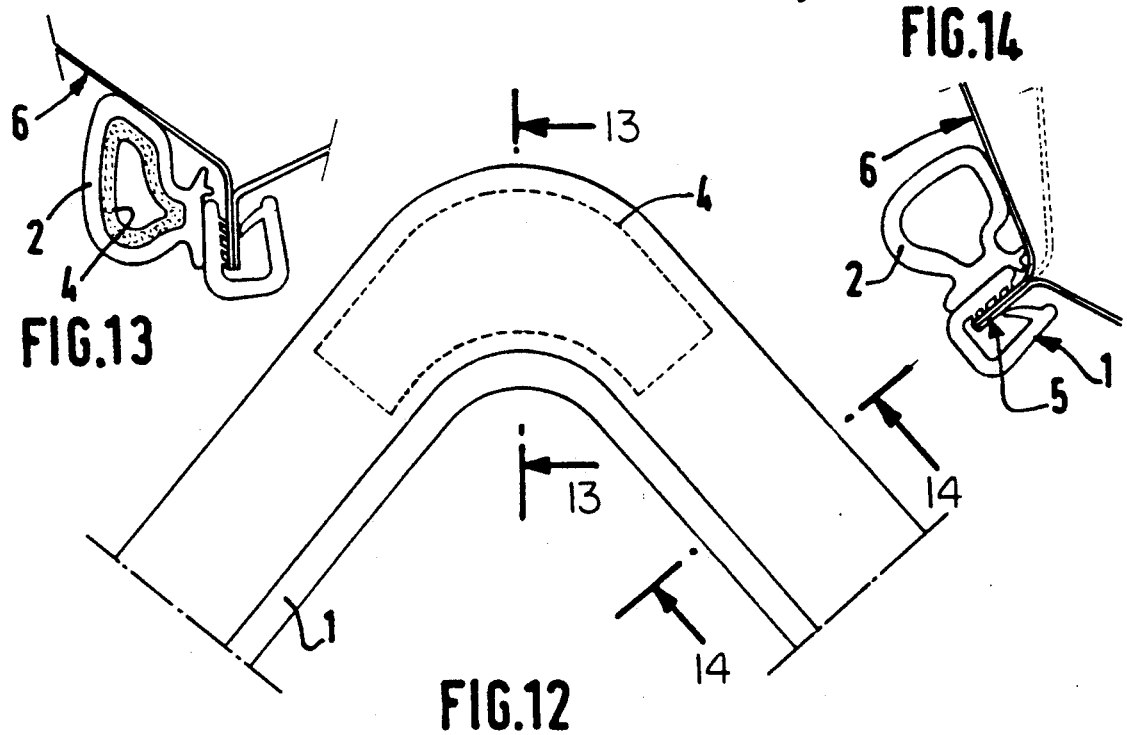

5,296,067

PROCESS FOR PRODUCTION OF A SEAL FOR THE FRAME OF AN APERTURE OF THE BODY OF AN AUTOMOBILE

BACKGROUND OF THE INVENTION

The present invention relates to a seal for the frame of an aperture of the body of an automobile or similar. A process for production of this seal is also a subject of the invention.

It is known that such seals for automobile door or trunk frames generally comprise a grip-forming channel section of U-shaped cross-section, in a thermoplastic material provided with a metal reinforcement, this channel section being intended to cap a projecting part of the frame so as to secure the seal to it, and a resiliently deformable tubular element, generally in a cellular material, which is contiguous to the grip-forming channel section and which is intended to be compressed between the frame and the corresponding movable element of the automobile so as to ensure tightness.

The grip-forming channel section and the tubular element may be coextruded from the same extrusion head. They may also be produced separately and be secured to one another afterwards by bonding.

It is to the latter production process that the present invention relates and it aims to remedy the disadvantages encountered when fitting these seals onto body opening frames which have very sharp curves in some corners.

In fact, in such locations, the tubular element, which is of a relatively large volume and whereof the cross-section generally has a complex profile, tends, on the one hand, to form wrinkles all the more pronounced as the curvature of the frame becomes sharper, on the other hand, to become offset with respect to the grip-forming channel section and to become deformed.

This disadvantage is well-known in the Art (see the Applicant's French patents and patent applications No 2,247,341, 2,133,107, 2,469,321 and 2,624,191) and various solutions to this problem have been proposed, but they are all relatively complicated and costly, because in most instances they involve adding a local excess of material onto the part of the seal located in the corner of the frame.

SUMMARY OF THE INVENTION

The present invention aims to remedy this disadvantage in a different manner by locally not securely attaching the grip-forming channel section and the tubular sealing element to one another, at the time of assembly of the elements of the seal, and by giving to the portion of this tubular element not securely attached to the channel section a length slightly greater than that of the corresponding portion of the channel section, this portion being joined afterwards by bonding. In this manner, in arranging this part of the seal in the corner of the door frame which has a very sharp radius of curvature, the tubular sealing element will possess a degree of freedom with respect to the grip-forming channel section and it will thus be able to occupy of its own accord the most favorable position, without wrinkles, deflections or other deformations, when it is fitted onto the frame, by its local offsetting into the corner with respect to the grip-forming element.

The invention consequently has as its subject a seal for the frame of an aperture of the body of an automobile, this seal comprising a reinforced grip-forming channel section of U-shaped cross-section, in a thermoplastic material, and a tubular sealing element in a resiliently deformable material, which adheres laterally to the outer surface of the channel section of U-shaped cross-section, characterized in that, along at least part of its length, corresponding to the location of a corner of the aperture frame to be equipped, the tubular sealing element has a length greater than that of the part of the channel section to which it adheres, the portion of the tubular element of length greater than that of the corresponding part of the channel section being offset laterally with respect to the latter.

The tubular section will thus fit in optimum manner the corresponding shape of the corner of the door frame which the seal is intended to equip.

The invention also has as its subject a process for production of a seal for the frame of an aperture of the body of an automobile, this seal comprising a reinforced grip-forming channel section of U-shaped cross-section, in a thermoplastic material, and a tubular sealing element, in a resiliently deformable material, which adheres laterally to the outer surface of the channel section of U-shaped cross-section, this process being of the type in which the channel section of U-shaped cross-section and the tubular sealing element are produced separately and are joined by bonding, this process being characterized in that, during the bonding phase, the channel section of U-shaped cross-section and the tubular sealing element are separated along at least part of their length by a packing piece opposing their secure attachment to one another at this location, this packing piece being arranged so that the tubular element forms above the channel section a bridge having a length greater than that of the corresponding part of the channel section, this packing piece being then withdrawn from the seal, and the previously separated parts being then joined by bonding.

The packing piece used may also serve to offset laterally with respect to the channel section the portion of the tubular element which does not adhere to the latter.

This process is therefore very easy to implement and the invention thus enables the above-mentioned disadvantages of the prior art to be remedied in a simple and very inexpensive manner.

In a manner known per se, the part of the tubular element of length greater than that of the channel section may be reinforced internally, either by a tubular insert, for example in a cellular material, or by a foam of plastic material cured in situ. This part may also undergo permanent deformation thermally so as to increase locally its cross-section.

BRIEF DESCRIPTION OF THE DRAWINGS

The attached drawings, which are not of a limitative nature, show various embodiments implementing the invention. In these drawings:

FIG. 5 is a perspective view showing the part of the tubular element not securely attached to the channel section of U-shaped cross-section;

FIG. 6 is a side view of this same seal, showing the raising of the tubular element above the channel section of U-shaped cross-section;

FIG. 7 is a section on line VII—VII of FIG. 6;

FIG. 8 shows a seal according to the invention with a reinforcement in a curved part;

FIGS. 9 and 10 are two sections on line IX—IX, showing two types of reinforcement;

FIG. 11 shows another form of embodiment of a seal according to the invention, in which the part of the tubular element initially not securely attached to the channel section of U-shaped cross section has been deformed thermally before being securely attached to the latter, so as to occupy a greater volume without forming wrinkles in the corner of a door frame;

FIG. 12 is a plan view of the seal of FIG. 11 fitted with an internal reinforcement in the corner part of the door frame;

FIGS. 13 and 14 are sections along lines XIII—XIII XIV—XIV of FIG. 12.

DETAILED DESCRIPTION OF THE PREFERRED EMBODIMENTS

Figure 2:
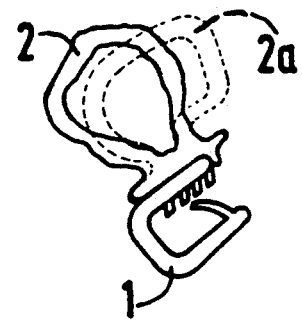
FIG. 2 is a section along line II—II of FIG. 1.
Figure 1:
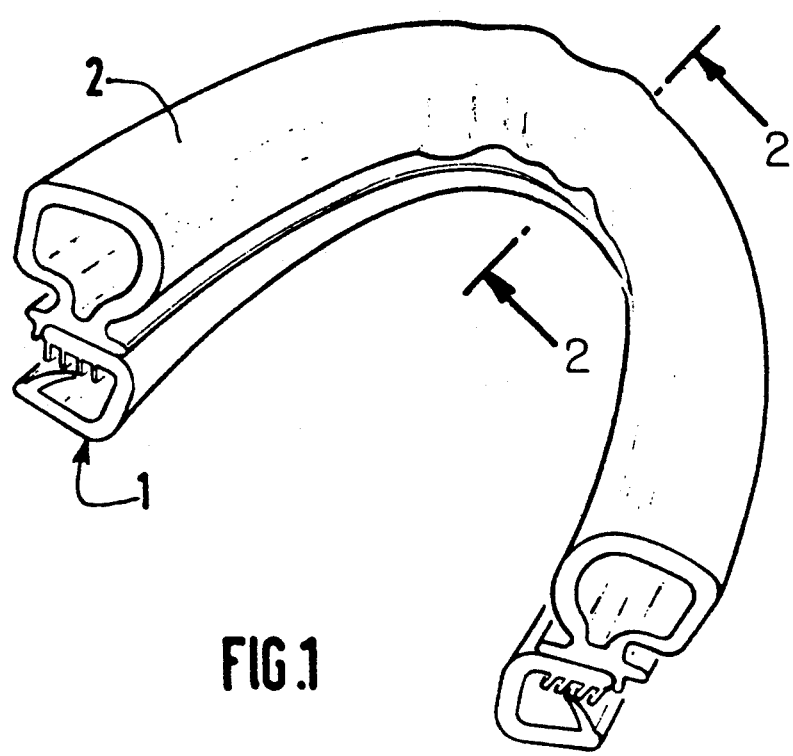
FIG. 1 is a perspective view of a seal of the prior art sharply curved and showing wrinkles and a deflection in the curved part.

The seal for the frame of an aperture of the body of an automobile which is shown in FIGS. 1 and 2 comprises, in a known manner, a grip-forming channel section 1, of U-shaped cross-section, which comprises a metal reinforcement, also of U-shaped cross-section, buried in the mass of the polymer constituting the channel section, polyvinyl chloride for example. This channel section 1 is intended to cap and grip a projecting edge of the body aperture to be equipped and onto the outer face of the branch of the U intended to be turned towards the exterior of the body is bonded a tubular sealing element 2, intended to be compressed between the frame of the aperture and the movable member closing this aperture, a door for example. The tubular element 2 is in a resiliently deformable material and, preferably, in cellular rubber.

As shown in FIGS. 1 and 2, when such a seal is bent tightly, for example in order to fit the shape of a door frame whereof a corner has a sharp curvature, the tubular element 2 becomes wrinkled in the corner and tends to be deflected from the position 2a which it ought to have (position shown in broken lines in FIG. 2).

Figure 3:
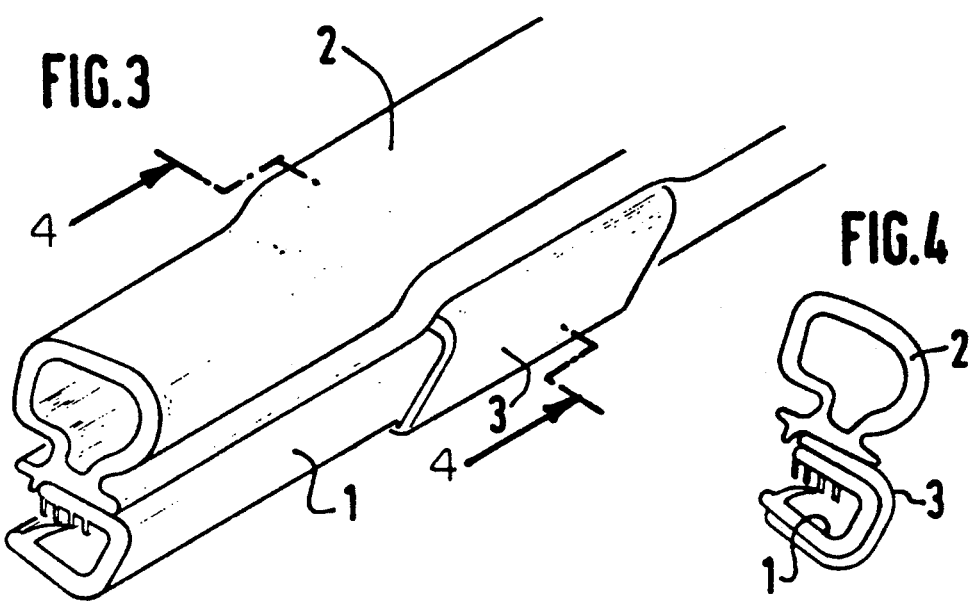
FIG. 3 is a perspective view showing the implementation of the production process according to the invention.
Figure 4:
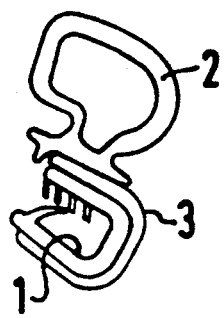
FIG. 4 is a section along line IV—IV of FIG. 3.

It is this disadvantage which the present invention aims to remedy and, to this end, it proposes, during the phase of bonding of the tubular element 2 onto the channel section 1, to interpose between them, at the location corresponding to the corner of the door frame to be equipped, a packing piece 3, formed for example, as shown in FIGS. 3 and 4, by a clamp or a clip adapted to cap the channel section transversely over a certain length (see FIGS. 3 and 4). Because of the presence of the packing piece 3, the channel section 1 and the tubular element 2 will not adhere to one another at this location and the unbonded part of the element 2 will be raised above the corresponding part of the channel section 1, thus having a length greater than that of this part. These two parts will afterwards be joined to one another by bonding.

Thus, during the phase of bonding sealing element 2 onto channel section 1, first and second spaced apart portions of the sealing element are placed against first and second spaced apart portions, respectively, of the channel section. These first and second portions of the sealing element 2 are spaced apart by an intermediate portion of element 2, and the first and second portions of the channel section 1 are spaced apart by an intermediate portion of the channel section; and the packing piece 3 is interposed between the intermediate portions of the sealing element and the channel section. The first and second portions of the sealing element are bonded to the first and second portions of the channel section, respectively, while maintaining the packing piece between the sealing element and the channel section to prevent the intermediate portions of the section 1 and element 2 from being bonded together.

As shown in FIGS. 5 through 14, the seal constructed in this manner can be bent with a sharp curvature without for all that the tubular element 2 becoming wrinkled, deflected or deformed in any manner whatever, since, in the corner portion subjected to the curvature (see FIGS. 5 through 7), because of the excess length of the element 2 with respect to the channel section 1. The element 2 can thus retain a tubular shape unaffected by the curvature and can occupy the most appropriate position in the corner. As was indicated above, the packing piece 3 used during the bonding phase may moreover have such a shape that it offsets the element 2 laterally with respect to the channel section 1, so as to help the fitting of this element 2 in the corner of the door frame.

After withdrawal of the packing piece 3, the parts of the channel section 1 and of the element 2 not securely attached to one another will be joined by bonding of their corner portions.

In order to make the tubular element 2 more resistant to deformation in the corner portion of the door frame, before securely attaching it to the channel section 1, various means may be used.

A tubular insert 4, for example in a cellular material, may simply be housed in the tube 2 in a known manner at this location, as shown in FIGS. 8 and 9.

It is also possible to introduce a resin of plastic material 7 into the part of the tubular element 2 intended to be angled (FIG. 10) and then effect the curing and optionally the expansion in situ of this resin.

Lastly, as shown in FIGS. 11 through 14, where the channel section 1 is shown in operational position, that is to say straddling and gripping a projecting part 5 of a door frame 6, the corner portion of the tubular element 2 may be deformed thermally in a permanent manner before it is securely attached to the channel section, so as to cause it to spread at this location, so that it has a greater cross-section and occupies a larger volume, thus preventing it from becoming wrinkled or deformed.

In this case, also, as shown in FIGS. 12 through 14, a tubular insert 4 may be housed in the spread portion of the tubular element 2, so as to increase its strength in the curved part. A resin could also be injected into it and there be cured and expanded in situ.

All of these embodiments of the invention will therefore be easy to implement in an inexpensive manner. The invention therefore provides a simple and effective means for retaining the proper shape of the tubular sealing elements even in very sharply curved parts of the frames of apertures of the bodies of automobiles.

We claim:

1. A method for producing a seal for a frame of an opening in an automobile body, comprising:
    a) providing a grip forming channel section having a U-shaped cross section and made of a thermoplastic material;

b) providing a tubular sealing element made of a resiliently deformable material, said sealing element being separated from the channel section;

c) placing first and second portions of the sealing element against first and second portions, respectively, of the channel section, the first and second portions of the sealing element being spaced apart by an intermediate portion thereof, and the first and second portions of the channel section being spaced apart by an intermediate portion thereof, each of said intermediate portions having a respective length;

d) interposing a packing piece between said intermediate portions to separate said intermediate portions from each other and to form the intermediate portion of the sealing element into a bridge section spaced from and having a length greater than the length of the intermediate portion of the channel section;

e) bonding the first and second portions of the sealing element to the first and second portions, respectively, of the channel section while maintaining the packing piece between the intermediate portions of the channel section and sealing element to prevent said intermediate portions from being bonded together;

f) removing the packing piece;

g) bending the channel section and the sealing element; and h) bonding the bridge section and the intermediate portion of the channel section together.

2. A method according to claim 1, wherein the packing piece is constituted by a clamp or a clip (3) which caps the channel section (1) over a part of the length of the channel section.

3. A method according to one of claims 1 and 2, wherein the packing piece has such a shape that it offsets laterally, during the bonding step (e), the intermediate portion of the sealing element.

4. A method according to claim 1, further including the step of thermally deforming the intermediate portion of the sealing element so as to increase locally the cross-section of the intermediate portion of the sealing element before bonding step (h).

5. A method according to claim 1, further including the step of inserting a reinforcement element, constituted by a tubular insert, into the bridge section of the sealing sealing element before bonding step (h).

6. A method according to claim 1, further including the steps of introducing a resin into the bridge section of the sealing element, and curing the resin in situ.

* * * * *

UNITED STATES PATENT AND TRADEMARK OFFICE
CERTIFICATE OF CORRECTION

PATENT NO. : 5,296,067
DATED : March 22, 1994
INVENTOR(S) : Francois Mesnel, et. al.

It is certified that error appears in the above-indentified patent and that said Letters Patent is hereby corrected as shown below:

Column 6, line 22, Claim 5, delete second occurrence of "sealing"

Signed and Sealed this

Twentieth Day of September, 1994

*Attest:*

BRUCE LEHMAN

*Attesting Officer*     *Commissioner of Patents and Trademarks*